Oct. 5, 1926.

H. C. WELTER

1,601,896

CHECK WRITING MACHINE

Filed April 18, 1923   5 Sheets-Sheet 2

INVENTOR.
Herman C. Welter
BY
ATTORNEY

Oct. 5, 1926.

H. C. WELTER

CHECK WRITING MACHINE

Filed April 18, 1923       5 Sheets-Sheet 3

INVENTOR.
Herman C. Welter
BY
Osborne L. Gurney
ATTORNEY

Oct. 5, 1926.

H. C. WELTER

CHECK WRITING MACHINE

Filed April 18, 1923 5 Sheets-Sheet 5

INVENTOR.
Herman C. Welter
BY Osborne L. Gurney
ATTORNEY

Patented Oct. 5, 1926.

1,601,896

UNITED STATES PATENT OFFICE.

HERMAN C. WELTER, OF ROCHESTER, NEW YORK, ASSIGNOR TO HALL-WELTER CO. INC., OF ROCHESTER, NEW YORK.

CHECK-WRITING MACHINE.

Application filed April 18, 1923. Serial No. 632,869.

The present invention relates to printing apparatus and more particularly to that class of machines known as check writers which not only print in words or numerals on checks, drafts or other negotiable instruments the amounts for which they are payable, but also mutilate the surface of the paper in such a manner that ink is impregnated into the fibers thereof so that erasure of the printed matter is made impossible without the texture of the paper being destroyed.

An object of the invention is to provide what may be termed a forgery proof check writer, and to this end several improvements are introduced into the art, one of which is to print not only the amount for which a check is payable but also the drawer's name or other distinctive mark on the amount line, the bank being notified not to honor checks unless the name or such distinctive mark appears thereon in the manner stated. This necessitates forming the drawer's name or mark, as may be preferred, as a type line on the printing element, such element usually being a cylinder or wheel with the several lines of type thereon arranged in such manner as to be selectively brought into position to coact with a common platen, and in doing this I provide a type wheel having removable and interchangeable type bars, the specific construction of the wheel and arrangement of the type bars forming subject matter of a copending application filed Feb. 1, 1923, Ser. No. 616,369. By having these type bars removable and interchangeable, type wheels having a common set up are provided for all machines, while the individual purchaser may for a nominal cost secure additional type bars bearing such words or characters as desired and by this provision it will be seen that the machine while primarily a check writer may be adapted for use in marking or printing on commercial papers other than checks and drafts such, for instance, as order slips, invoices, receipts, express forms and the like.

With the type wheel formed to print the drawer's name, it is essential that the machine be locked against use by any other than an authorized person, and it is a further object of the invention to provide a lock having a bolt operable in such manner as to prevent a check being properly printed upon or fed through the machine until such bolt is released.

Another object of the invention is to simplify the feeding mechanism which object is accomplished by advancing the work the same distance after each printing operation and thus eliminating the mechanism necessary to feeding the work variable distances as is generally done in machines of this character. In doing this, the type bars are so arranged on the carrier that when selectively brought into printing position they will print their respective lines parallel to each other and regularly spaced but diagonal to the direction in which the work is fed.

It is a further object of the invention that the diagonally arranged printing appear symmetrical and to this end all type lines, although bearing words or characters of different lengths, are of the same length; and it is a still further object of the invention that the amount for which a check is payable be printed in both words and numerals. These ends are accomplished by having the word at the beginning and the numeral or character indicating the word, at the end of each line, except where the word occupies the entire line, and to fill in the variable spaces between the several words and their numerals with a conventional outline.

A further object of the invention is to provide for a reciprocating movement of the type carrier through a rotary movement in one direction only of the operating member and also to provide against automatic feeding of the work except after each printing operation.

A further object of the invention is to provide means operable on movement of the type carrier to inoperative position to reink the type line last used.

A further object of the invention is to provide a combined protecting plate and stripping device intermediate the type carrier and the platen and, also, the provision of a platen of novel construction embodying movable sections functioning as stripping means.

A further object of the invention is to provide an adjustable check gauge which automatically moves out of contact with the work while the latter is being fed forward after each printing operation, thus in the event that the edge of the check is perforated, preventing any accidental displacement of the check or hindrance to the feeding movement by engagement of the roughened edge thereof with an edge of the gauge.

And, a still further object of the invention is to provide means for marking or mutilating the paper over the payee's name so as to afford still further protection to the drawer, and this I accomplish by means of an attachment to the machine and independently operable, such attachment also forming subject matter of a copending application filed Aug. 23, 1923, Ser. No. 659,011.

To these and other ends the invention consists of certain parts and combination of parts as will be fully set forth in the following description and particularly defined in the appended claims.

The accompanying drawings illustrating the invention are as follows:—

Fig. 20 is a plan view of the check gauge and showing it in dotted lines as moved out of engagement with the work.

Fig. 21 is an enlarged fragmentary side view of the type support.

Fig. 22 shows one of the type bars in side view.

Fig. 23 shows in face view the end plate members of the type support for yieldingly engaging the type bars.

Fig. 24 is a fragmentary sectional view of the type support taken longitudinally of one of the type bars.

Fig. 24$^A$ shows in detail a modified form of the rigid type bar retaining member.

Fig. 25 is a detail view showing the lock bolt in operative position.

Fig. 26 shows the dial wheel in side view with a portion of one of the side plates broken away.

Fig. 27 is a sectional detail on the line 27—27, Fig. 26.

And, Fig. 28 is a fragmentary portion of a check having the drawer's name and amount for which the check is made payable illustrated as printed by the machine shown in the accompanying drawings, and the payee's name protected by markings on the paper made by the marking attachment.

Similar reference numerals refer to similar parts throughout the several views.

The machine base represented by the numeral 1 has a rear portion 2 upon which is secured by bolts 3 the upright portion 4 of a casing comprising also a neck or forwardly projecting portion 5 and a depending head 6, this head being spaced slightly above a cover plate 7 for the base to permit movement of the work 8 which is supported upon this cover or bed plate 7.

In the side walls of the head portion 6 are vertically extending openings 9 forming guideways for the side arms of a yoke 10, and revolubly supported in the lower ends of these side arms is a shaft 11 to which the type wheel 12 is fixed. Side plates 13 and 14 cover the openings 9 and hold the yoke 10 against lateral movement, the plate 14 being slotted to receive and permit vertical movement of the shaft 11 which projects to one side of the casing and carries on such extended portion a dial wheel 15 and turning knob 16, the latter preferably being provided with a suitable rubber grip 17. Secured to the connecting cross bar of the yoke 10 by screws 18 is a member 19 carrying pins 20 on which rollers 21 are loosely mounted, these rollers being spaced one above the other and engaging the face of a cam 22 fixed to the operating shaft 23 which extends through a vertical slot 24 in the member 19 and has bearing in the side walls of the casing, a crank 25 being secured to the shaft 23 on the side of the machine opposite the dial wheel and provided with a handle 26.

Carried by the member 19 in rear of the rollers 21 is a stud 27 which is engaged by the bifurcated end 28 of a lever 29 extending rearwardly and fulcrumed at 30 intermediate its ends, the other end of the lever having pivotal connection at 31 with the upper end of a vertically extending arm 32 operating in the portion 4 of the casing. The lower end 33 of the arm 32 is guided for vertical movement in a slotted plate 34 secured to the base part 2 and forms a rack for engaging the toothed segment 35 loosely mounted on the feed shaft 36 rotatably supported in the front and rear side walls of the base, the toothed segment 35 being formed on a sleeve 37 carrying an arm 38 to which is pivoted a spring pawl 39 for engaging a ratchet wheel 40 fixed to the shaft 36 and effecting rotation of the feed shaft through downward movement of the arm 32. Also fixed to the shaft 36 are two feed rollers 41 carried on the ends of a sleeve 42 and equally spaced on opposite sides of the axis of the type wheel with their peripheries projecting slightly above the plane of the bed plate 7 through slots in such plate.

Figures 11, 12, 13, 14:
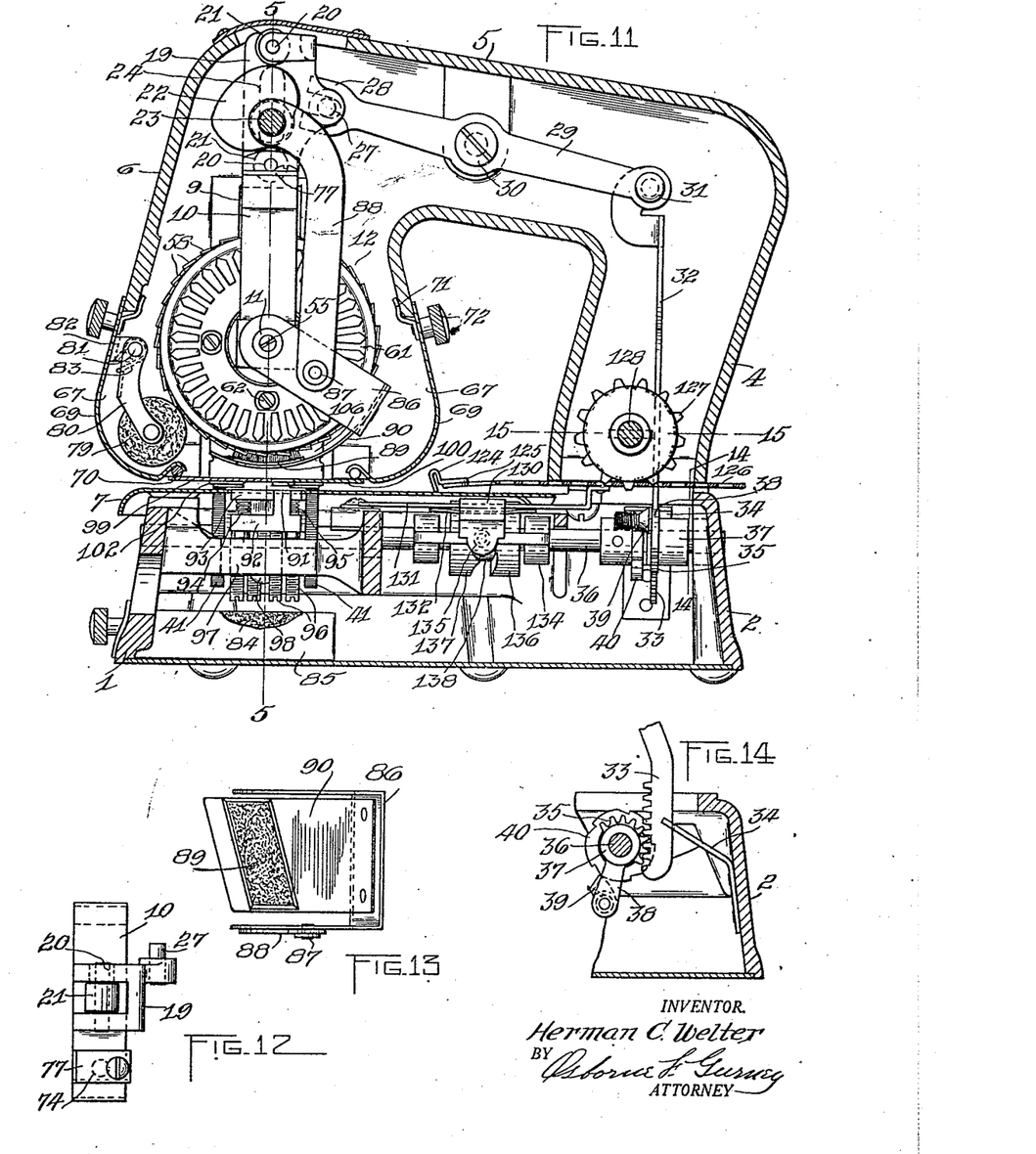
Fig. 11 is a sectional view on the line 11—11, Fig. 5.
Fig. 12 is a plan view of the yoke which carries the type wheel.
Fig. 13 is a plan view of the reinking device.
Fig. 14 is a sectional detail on the line 14—14, Fig. 11.
Figure 15:
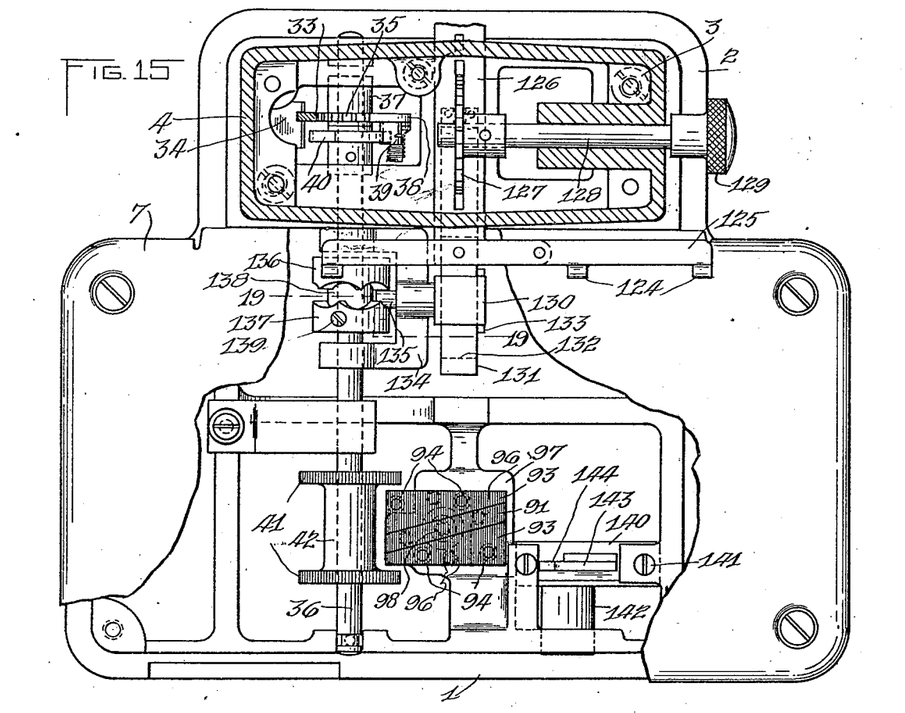
Fig. 15 is a plan view of the base with part of the cover plate broken away and with a portion of the upper section of the casing shown in section on the line 15—15, Fig. 11.
Figures 16, 17:
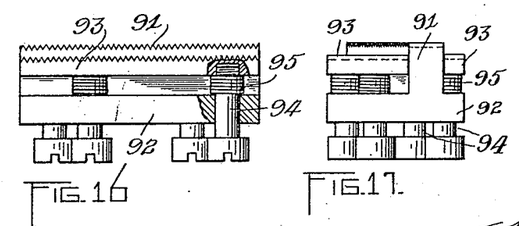
Figs. 16, 17 and 18 are detail views of the platen, the movable sections being shown depressed in Figs. 16 and 17.
Figure 18:
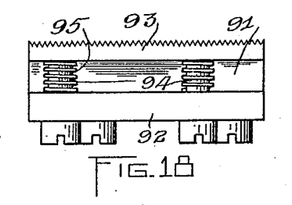
Figure 19:
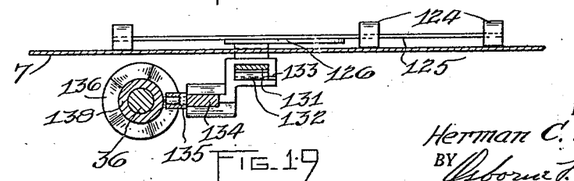
Fig. 19 is a sectional detail on the line 19—19, Fig. 15, showing the check gauge and the means for automatically moving the same.

From the foregoing it will be understood that on rotation of the operating shaft 23 by means of the crank 25 the cam 22 effects a reciprocation of the yoke 10 and type wheel 12 carried thereby, and that on the upward or return movement of the reciprocating parts the lever 29 is actuated to move the arm 32 downward causing rotation of the feed shaft 36 by engagement of the pawl 39 with a tooth on the ratchet wheel 40, while, on the downward movement of the type wheel the arm 32 is caused to move upward and reset the pawl 39 for a further rotation of the feed shaft. This feed shaft operating mechanism effects an invariable movement of the feed rollers and, as shown in Fig. 14, the spring pawl 39 normally occupies a position relative to the next tooth to be engaged thereby so that lost motion is provided in order that the type wheel may move out of contact with the work before feeding movement commences.

Rotation of the operating shaft 23 is in one direction only, the object of this being to prevent the type wheel being moved far enough toward printing position to effect a setting of the feed shaft operating mechanism and then returned to its starting position thus causing the work to be fed forwardly without the printing operation having been performed. It insures a complete operative movement of the type wheel once such movement has been started. To this end any suitable clutch for the shaft 23 may be provided. In this instance, a ball clutch of known construction is used and comprises a plurality of balls 44 operating on the inclined surfaces 45 of a toothed wheel 46 fixed to the shaft and turning in a cup member 47 seated in a boss 48 formed on the casing member 6, the cup member being closed by a ball retaining plate 49 interposed between the toothed wheel and a shoulder on the shaft.

Figures 1, 2, 3, 4:
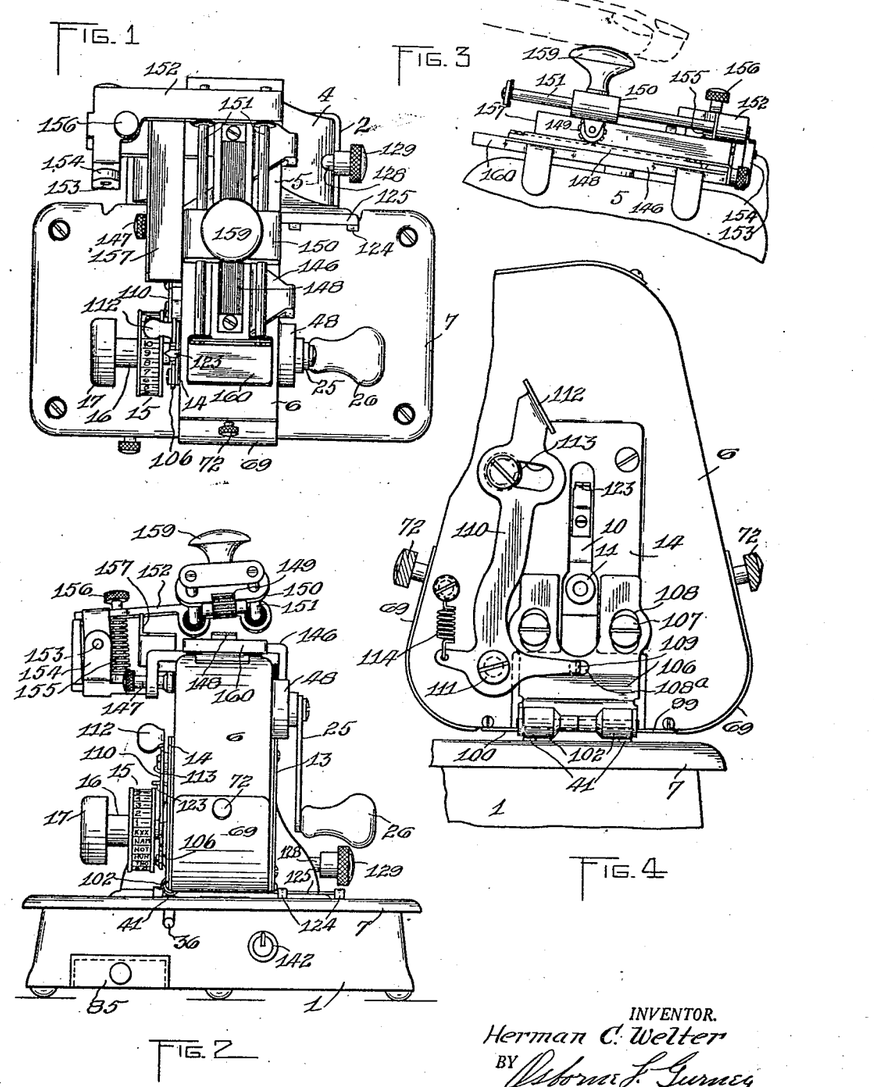
Figure 1 is a plan view of the check writing machine with the marking attachment secured thereon.
Fig. 2 is a front elevation of the machine seen in Fig. 1.
Fig. 3 shows the check marking attachment in side elevation.
Fig. 4 is a fragmentary side view of the machine showing in detail the pressure rollers and their operating lever.
Figures 5, 6, 7, 8, 9, 10:
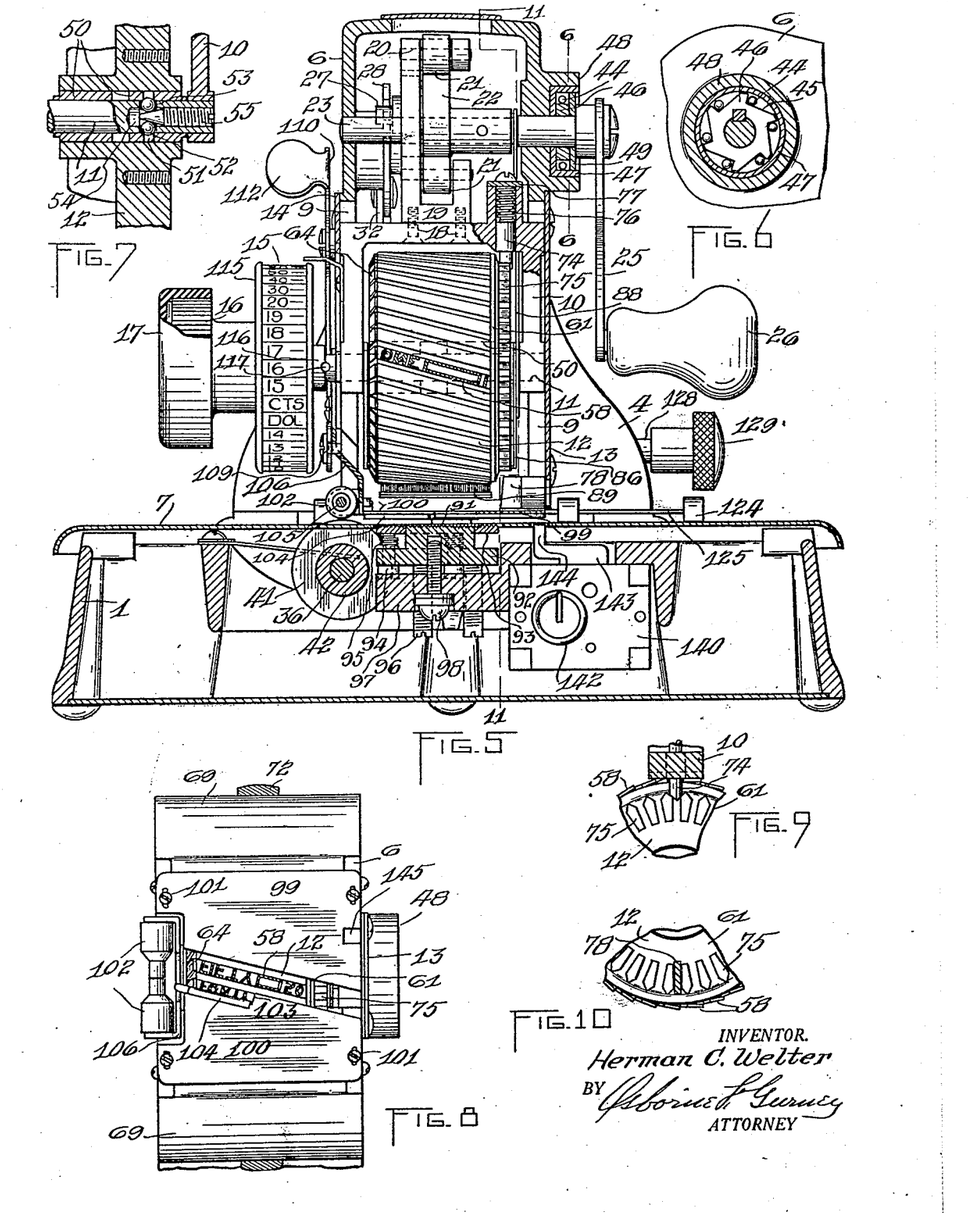
Fig. 5 is a sectional view on the line 5—5, Fig. 11, with parts of the operating mechanism shown in full.
Fig. 6 is a sectional detail on the line 6—6, Fig. 5.
Fig. 7 is a sectional detail of the type wheel as on the line 5—5, Fig. 11.
Fig. 8 is a bottom view of the overhanging head portion of the casing.
Figs. 9 and 10 are fragmentary details showing, respectively, the yielding and positive locks for the type wheel.

As an effective and simple way of keying the type wheel 12 to the shaft 11 to permit these parts being readily assembled and also to lock the wheel against lateral movement on the shaft, the hub of the wheel, see Fig. 7, is bored out to receive bushings 50 fixed to the shaft, one of these bushings being bored transversely at 51 to receive balls 52 of larger diameter than the bore 51 and lying in a hole 53 in the shaft which intersects a longitudinally extending bore 54 threaded to receive a screw 55 having a tapered end for forcing the balls 52 outwardly so as to seat in the said bushing opening.

As hereinbefore stated the type bars are so arranged on the type wheel or support 12 that when brought selectively into printing position the printed lines will be parallel to each other but diagonal to the direction of feed of the work. Any type support with the type so arranged thereon as to accomplish this result may be used, but I have shown and prefer to employ a type wheel such as described in the hereinbefore mentioned copending application. Briefly described the construction of such a wheel is as follows:—The peripheral surface is formed with a plurality of regularly spaced slots 56. These slots are open ended and extend from one side of the wheel to the other and at an angle to its axis of rotation, the side walls of each slot preferably being parallel while the bottom wall is in a plane tangential to a concentric circle of the wheel. Fitted in the slots 56 are bars 57, the outer faces of which constitute type faces 58 bearing any suitable words or characters and these type faces, in this instance, are serrated so as, in the printing operation, to break the paper in order that ink will be forced into the fibers thereof to prevent erasure of the printed matter. This tangential arrangement of the type bars relative to the wheel brings each type face 58, when moved into printing position, in a plane parallel with the face of the platen which, in this instance is substantially in the plane of the work support 7. Although the bars arranged at an angle to the axis of the wheel, the top and bottom end edges are parallel to its side faces while the end faces 59 of the bars are inclined upwardly and inwardly, these end faces at one side of the wheel lockingly engaging the undercut annular portion 60 of a rigid circular retaining plate 61 secured for annular adjustment to the wheel by screws 62, while the opposite bevelled end faces of the bars are yieldingly engaged by a circular plate 63 of thin spring metal, such plate being slotted radially to form an annular series of regularly spaced spring members 64, one for each type bar, these spring portions extending outwardly from the body of the plate over the wheel rim and then inwardly substantially parallel with the end faces of the bars and engaging the bars under tension, the spring plate being secured to the wheel by means of a reinforcing ring 65 and screws 66.

Figures 20, 21, 22, 23, 24, 25, 26, 27, 28:
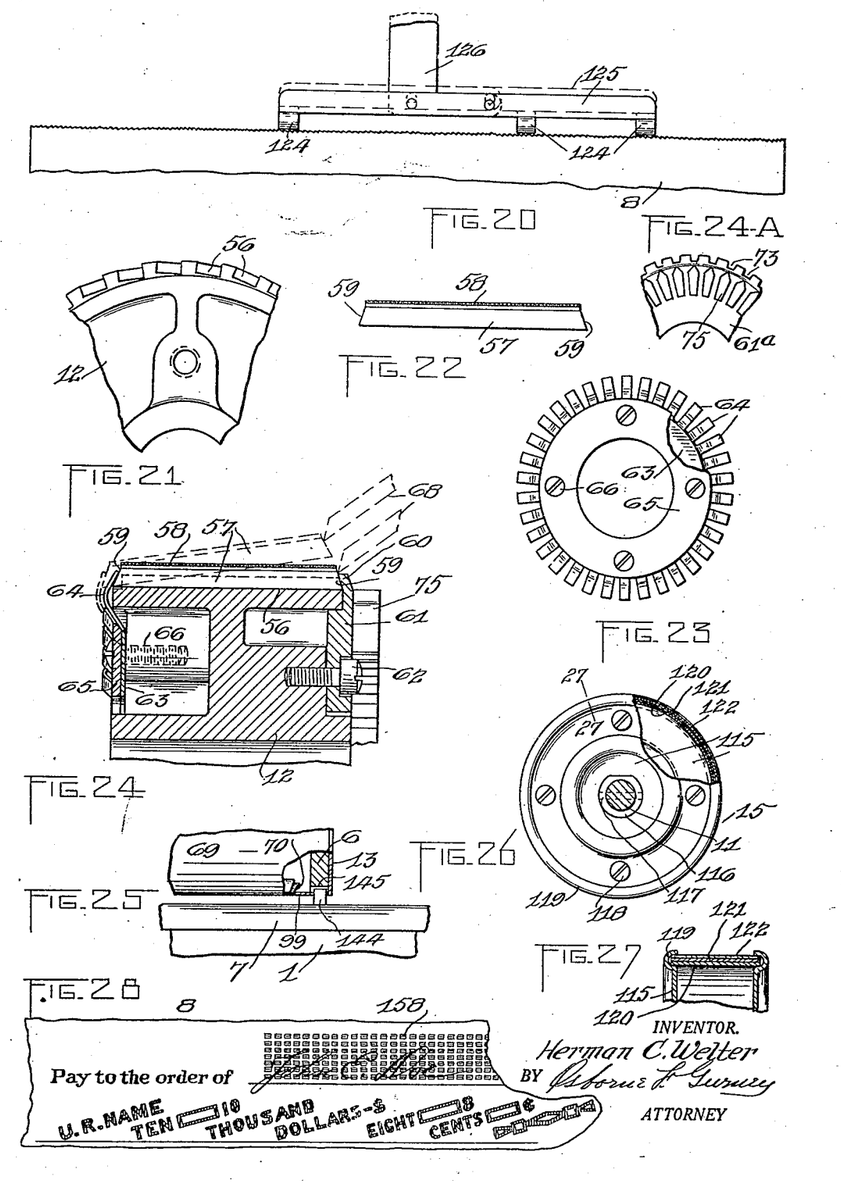

Openings 67 in the front and rear walls of the casing member 6 are normally closed by removable cover plates 69 the bottom edges of which are curved to lockingly engage over frame rods 70 while pivoted latches 71 operable by knobs 72 secure the plates at their upper edges to the casing. The front opening 67 permits access to the type wheel for the substitution of one type bar for another, a suitable tool 68, indicated in dotted lines in Fig. 24, being employed to move a bar 57 longitudinally in its slot against the action of its spring member 64 to disengage the bar from the undercut portion 60 of the plate 61. In Fig. 24ᴬ there is shown a modification of the rigid type bar retaining plate, the undercut peripheral edge of such plate 61ª being notched as at 73 to permit engagement of the tool 68 with the ends of the type bars. There is a notch 73 at the end of each type bar and the notches are of less width than the bars so that abutting shoulders for the bars are provided. By having the type bars removable a perfect bar may be substituted for a damaged one without the necessity of furnishing an entirely new wheel. Also, should a purchaser desire a certain destinctive line of type for his checks such as one bearing his name so that his name may be printed on the checks in the same manner and either preceding or following the amount for which the check is drawn, the same may be furnished at a nominal cost while permitting him to purchase a stock machine and not requiring a type wheel to be made special. And, by having the type bars removable a user may insert type bars bearing such words or characters as will permit the machine being used for many purposes other than printing on checks or like negotiable instruments.

The type wheel is yieldingly held against rotation when in inoperative position by means of a spring actuated plunger 74 housed within the yoke member 10 and having a bevelled inner end which normally engages correspondingly formed opposing faces of adjacent ones of an annular series of projections 75 formed on the outer face of the type bar retaining plate 61, the hole in the yoke member for receiving the plunger 74 and coiled spring 76 being closed at its upper end by a movable plate 77. The type wheel is rotated to bring a selected line of type into printing position and is yieldingly held in such position of adjustment by the spring plunger 74, but as the wheel is moved toward and from the platen it is rigidly held against rotary movement by a detent 78 carried by the guideway cover plate 13 and which engages the opposed faces of two adjacent projections 75, the spaces or slots between the projections 75 being the same in number as the type bars.

The type are inked by a roller 79 mounted in a swinging frame 80 supported on a rod 81 carried by a bracket 82 secured to the front cover plate 69, a spring 83 encircling the rod and acting to hold the frame 80 with the roller in contact with the type wheel. This roller is reinked when required by removing the cover plate 69 and passing the roller back and forth over a well saturated ink pad 84 kept within a removable drawer 85 in the machine base.

Straddling the type wheel is a U-shape member 86 the side arms of which are pivoted at their free ends to the shaft 11, and to one of these side arms intermediate its ends is pivotally connected at 87 the lower end of a link 88, the upper end of which has pivotal connection with the operating shaft 23. The link 88 normally supports the U-shape member 86 in substantially the position shown in Fig. 11 so that an angularly disposed ink pad 89, carried by a plate 90 formed substantially concentric with the type wheel and secured at one end to the cross bar of the U-shape member, engages the line of type which is in position for printing. This pad constitutes a reinker so that any line of type may be repeatedly used without having to contact with the roller 79, the pad 89 through action of the link 88 moving rearwardly and upwardly when the type wheel is moved downwardly to make an impression, and returning to the position shown in Fig. 11 on the upward movement of the type wheel, the pad at all times, by its spring supporting plate 90, being yieldingly held in contact with the type faces.

A common platen is employed for coaction with the several lines of type as they are selectively brought into printing position. This platen is formed in three sections, viz, —a bed portion 91 of substantially the length and width of a type bar 57 and comprising an angularly disposed vertical web formed integrally with a rectangular base portion 92, and two vertically movable side sections 93, the three parts 91, 93 and 93 forming a rectangle of like area as the base portion 92 with the opposed angularly disposed side faces of the movable sections engaging the side faces of the bed portion 91. The movable side sections are provided with headed pins 94 which slidably engage through openings therefor in the base portion 92, coiled springs 95 encircling the pins and engaging between opposed faces of the sections 93 and base portion normally holding these sections with their top faces in substantially the plane of the bed face 91, although the position of the movable sections relative to the surface 91 may be predetermined by adjustment of the pins 94 which are threaded into the sections and have their shouldered ends engaging the underface of the base portion 92. The bed face 91 is, in this instance, serrated to form mating surfaces for the grooved type, and these serrations are preferably extended across the top faces of the side sections. The platen is supported for vertical adjustment upon the ends of studs 96 threaded upwardly through a part 97 of the machine base and is held in the desired position of adjustment by a screw 98 which also projects upwardly through the base part 97 and is threaded into the base portion 92 of the platen. This base part 97 is provided with suitable openings aligned with the pins 94 for receiving the heads of the pins on downward movement of the side sections 93. The face of the platen is substantially in the plane of the work support 7 which member is formed with an opening for receiving the platen.

As the type wheel is moved into contact with the platen the type, see Fig. 8, which is in printing position engages through an angularly disposed opening formed by the spaced inner edges of flexible plates 99 and 100 which cover the bottom of the casing member 6 and thus protect the work from contact with any but the proper type face, these plates being secured for slight adjustment toward and from each other by screws 101 threaded into the side walls of the casing. During this movement of the type wheel the type bars adjacent the printing one force the inner edges of the plates 99 and 100 downwardly into contact with the side sections 93 of the platen which are moved thereby slightly below the plane of the bed portion 91. Then on movement of the type wheel from the platen the paper printed upon is stripped from the type face by action of the flexible plates 99 and 100, and the movable platen sections on returning to normal position as the flexible plates spring upwardly tend to strip the paper from the platen bed section 91. The work is then fed forward through the action of the feeding mechanism hereinbefore described, and during such feeding movement is held between the feed rollers 41 and gripping rollers 102. During the printing operation there is a slight tendency of the paper to bulge at one point, and in order not to interfere with this action a portion of the plate 100 along its inner edge is cut away at 103, while a rib 104 on the under face of the plate 100 cooperates with the reduced portions of the gripping rollers in preventing the bulged portion of the paper from contacting with the type wheel, this rib also holding the work as it is fed forward from the said plate 100 to prevent smearing of the ink.

These gripping rollers 102 yieldingly bear against the feed rollers 41 and are loosely and independently mounted on a rod 105 carried by ears projecting outwardly from the inwardly offset portion of a plate 106 slidably supported against the outer face of the guideway cover plate 14 by screws 107 threaded into the casing and which have shouldered portions adjacent their heads engaging through slotted openings 108 in the movable plate. This plate 106 also has a center opening 108$^a$ for receiving a projection 109 formed on the end of the short arm of a bellcrank lever 110 pivoted to the casing at 111 and having a finger piece 112 formed at the free end of its longer arm, the lever having a limited throw because of the pin-and-slot connection 113 and by a coiled spring 114 normally held with the projection 109 holding the plate 106 with the gripping rollers engaging the feed rollers under yielding pressure. Lifting the gripping rollers by movement of the controlling lever 110 permits the work being readily inserted between the feed rollers and the gripping rollers and removed therefrom when the work has been completed.

In view of the type bars being removable and interchangeable it is desirable also that the printed strip on the dial wheel 15 be removable so that a strip may be furnished corresponding with the set up of the type wheel. To this end the dial wheel is formed of two side plates 115 held against turning on a sleeve 116 fixed to the shaft 11 by a pin 117, these plates being tied together by bolts 118 and formed with opposing annular recesses 119 for receiving an inner supporting or base strip 120, an intermediate strip 121 on which the indications are printed, and a protecting outer strip 122 of transparent material. In setting the type wheel to bring a certain line of type into printing position, the dial wheel is turned to bring the corresponding indication under the pointer 123 which is carried by the yoke 10 and operates in a slot in the plate 14.

In order to properly position the work on the machine so that, in the event of the work being a check, the printing will be along the ruled amount line, a check gauge is provided which of itself is old in machines of this character and usually is employed not only as a means for gauging the work during positioning of the same but also as a guide for the work when fed over the bed plate. This gauge consists of a plurality of aligned work engaging portions 124 formed on a longitudinally extending bar 125 and each having a free edge frictionally engaging the bed plate 7 so that a sheet of paper will not pass thereunder. This bar is secured to a rearwardly extending arm 126 slidably supported in the casing and comprising a rack adapted to be moved forward and back by means of a toothed wheel 127 mounted on the inner end of a shaft 128 having bearing in the casing member 4 and provided with a turning knob 129 on its outer end which projects to one side of the casing.

Checks are often printed in sheets which are perforated along the dividing lines between the checks and in this event the checks, except the top one from each sheet, have a perforated top edge which, when the check is fed over a support in contact with guide members such as indicated at 124, engages the edges of such members and causes the work to be thrown out of alignment. To overcome this objectionable feature I have provided means for automatically moving the gauge away from the edge of the work during the feeding movement and returning it so as to engage the work during the printing operation. This means, in the present instance, is embodied in a mechanism constructed and operable as follows:—

A slide 130 having an opening therethrough for receiving an arm 131 secured to the rack arm 126 of the gauge and lying below the latter member is frictionally held to such arm 131 by means of a flat spring 132 also extending through the said opening and bearing against the slide and the under face of the arm, ears 133 formed on the spring engaging the ends of the slide to hold the spring against displacement. Carried by the slide 130 is a yoke 134 the side arms of which are bored out to receive the feed shaft 36. Projecting from the yoke intermediate its side arms is a stud on which a roller 135 is mounted, this roller engaging in an annular groove between opposing cam faces on collars 136 and 137 carried by a sleeve 138 which in turn is fixed to the shaft 36 and is of such length as to permit a slight movement of the yoke axially of the shaft. The cam faces are similarly formed, each having regularly spaced ridges and grooves with the ridges and grooves of a cam surface each corresponding in number to the number of teeth on the ratchet wheel 40, and with the ridges and grooves of the two cam surfaces arranged in staggered relation, the collars 136 and 137 being relatively adjustable by having the collar 137 held to the sleeve 138 by a set screw 139. From the foregoing it will be seen that on each rotary movement of the feed shaft 36 by action of the pawl 39 engaging the ratchet wheel 40, the cam surfaces engaging the roller 135 will effect a movement of the yoke 134 back and forth and that the yoke will carry with it the gauge member so that the latter, as indicated in Fig. 20, on each feeding forward of the work 8 moves from the work to the dotted line position and back to the work. The frictional engagement of the slide 130 with the arm 131 permits adjustment of the gauge while the slide remains stationary.

In order to prevent the machine being used by any other than an authorized person, a lock is provided for obstructing passage of work in the proper direction through the opening between the bed plate 7 and the casing member 6. In the illustrated embodiment of the invention, a lock 140 is secured by screws 141 to the base below the bed plate 7 and has a barrel 142 projecting through an opening in the front wall of the base, operation of the lock being controlled by a key insertable in the barrel in the usual manner. The bolt 143 projects upwardly from the lock and is formed with a lug 144 which, when moved into locking position, engages through an opening in the bed plate 7, extends across the opening between the bed plate and the casing and enters a notch 145 in the wall of the casing.

Type faces 58 are shown in Figs. 5 and 8, while Fig. 28 illustrates printing done by the machine. Both the words and numerals, or characters indicating the words, are printed with the words at one end and the numerals at the other ends of their respective lines, the variable spaces between the words and numerals being filled in by a conventional outline such as the rectangular figure shown. Thus the amount of a check is printed in both words and numerals and the arrangement is such that the printed lines are all filled in and are of the same length.

As a means for protecting the payee's name a marking attachment for the machine is provided, this attachment as hereinbefore mentioned forming subject matter of a copending application but which may be briefly described as follows:—

A base 146 is so formed as to be clamped by a screw 147 to the casing portion 5 of the machine. Secured to this base is an elongated grooved bed or platen 148 adapted to coact with a grooved roller 149 mounted in a carriage 150 slidable on a guide comprising rods 151 carried by a lever 152 fulcrumed on a rod 153 supported by ears 154 projecting upwardly from the base 146 and normally held with the roller 149 out of engagement with the said platen by a coiled compression spring 155, an adjustable stop in the form of a screw 156 threaded through the lever and encircled by the spring 155 limiting movement of the roller toward the platen so that the depth of the marking in the paper by the roller may be predetermined. An adjustable work support and gauge 157 is mounted on the base 146, and the roller is also grooved axially so that markings on the paper will be as indicated at 158 in Fig. 28. In operating the device the lever 152 is forced downwardly against the action of the spring 155 by pressing on the knob 159 of the carriage 150 and the carriage moved along the guide rods 151 with the roller in contact with the check which is supported upon the platen 148, gauge member 157 and base extension 160.

From the foregoing it will be seen that I have provided a printing machine and marking attachment simple in construction and operation but embodying features of novelty which it is believed have been made sufficiently clear as to call for no further explanation herein.

It might be added, however, that I have provided a check writing machine in which springs, except one for the pawl 39, have been eliminated and in which all movable parts in both printing and feeding operations are controlled by the rotation in one direction only of the operating lever 25. Also, by providing a type wheel having removable and interchangeable type bars it will readily be seen that there is a great saving in the cost of manufacturing machines for export to countries having different monetary systems. And, with the type bars yieldingly held against longitudinal movement on the type wheel by the spring members 64, should the wheel be slightly out of true the bars when brought into coaction with the fixed platen will adjust themselves to the platen so that there is a perfect mating of the serrated surfaces and consequently a clean printing impression.

What I claim is:—

1. In a machine of the character described, a feed shaft, feed rollers and a ratchet wheel fixed to said shaft, an integrally formed toothed segment and arm rotatable on said shaft, a spring pawl pivoted to said arm for engaging said ratchet wheel, a rack engaging said toothed segment, a guide for said rack, and means for reciprocating the rack.

2. In a machine of the character described, a feed shaft, feed rollers fixed to said shaft, a toothed rack, a support guided for reciprocating movement, a type wheel revolubly mounted in said support, a lever fulcrumed intermediate its ends and having pivotal connection at one end with said support and at its other end with said rack, and pawl and ratchet means mounted on said shaft and operable by said rack for effecting rotation of the shaft on movement in one direction of the said support.

3. In a machine of the character described, a feed shaft, feed rollers fixed to said shaft, a toothed rack, a support guided for reciprocating movement, a type wheel mounted in said support, an operating shaft and a cam fixed thereon, means on said support for engaging the cam whereby rotation of the cam imparts reciprocation to the support, a lever fulcrumed intermediate its ends and having pivotal connection at one end with said support and at its other end with said rack, and pawl and ratchet means mounted on said feed shaft and operable by said rack for effecting rotation of such shaft on movement in one direction of the said support.

4. In a machine of the character described, a feed shaft, feed rollers fixed to said shaft, a toothed rack, a support guided for reciprocating movement, a type wheel mounted in said support, an operating shaft and a cam fixed thereon, means on said support for engaging the cam whereby rotation of the cam imparts reciprocation to the support, means permitting rotation of said operating shaft in one direction only, a lever fulcrumed intermediate its ends and having pivotal connection at one end with said support and at its other end with said rack, and pawl and ratchet means mounted on said feed shaft and operable by said rack for effecting rotation of such shaft on movement in one direction of the said support.

5. In a machine of the character described, a yoke guided for vertical movement, a type wheel revolubly supported in said yoke, an operating shaft mounted above said yoke, a cam fixed to said shaft, a member rigidly secured to said yoke and slotted to receive said shaft, rollers for engaging the cam face mounted in said member one above and the other below said shaft, a feed shaft, and a lever for effecting rotation of the feed shaft on movement in one direction of said yoke, one end of such lever having pivotal connection with the said roller supporting member.

6. In a machine of the character described, a platen, a yoke guided for movement toward and from the platen, a shaft revolubly supported in said yoke, a type wheel fixed to said shaft and having a plurality of type faces adapted to be selectively brought into position for coaction with said platen, an operating shaft and means for imparting reciprocation to said yoke through rotation of such shaft, a U-shape member straddling said type wheel, such member being disposed at an angle to the plane of movement of said yoke and mounted to turn on said first named shaft, a flexible plate carried by said U-shape member, an ink pad on said plate normally held in contact with the type face lying in printing position, and a link connecting an arm of said U-shape member with the operating shaft whereby reciprocation of the yoke imparts angular movement of said member for the purpose specified.

7. In a machine of the character described, a platen having an angularly disposed bed or impression surface, and vertically movable side sections, 8. In a machine of the character described, a platen having an angularly disposed bed or impression surface, vertically movable side sections, and spring means normally holding said side sections with their top faces in substantially the plane of said impression surface.

9. In a machine of the character described, a platen having an angularly disposed bed or impression surface, vertically movable side sections, guides for said side sections, and spring means normally holding said side sections with their top faces in substantially the plane of said impression surface.

10. In a machine of the character described, a platen comprising a base, an angularly disposed portion on said base and having an impression surface, side sections, pins on said side sections guided for movement in said base, springs encircling said pins between the side sections and base for normally holding the side sections with their top faces in substantially the plane of said impression face, a support for the platen, and means limiting outward movement of said pins.

11. In a machine of the character described, a platen comprising a base, an angularly disposed portion on said base and having an impression surface, side sections, pins on said side sections guided for movement in said base, springs for yieldingly supporting said side sections, a support for the platen, and means limiting outward movement of said pins, the pins being adjustable in said side sections whereby the relative position of the side sections to said impression face may be predetermined.

12. In a machine of the character described, a platen comprising a base, an angularly disposed bed portion on said base having a serrated impression surface, side sections having side faces abutting the side faces of said bed portion, the top surfaces of said bed portion and side sections forming a rectangle, pins on said side sections guided for movement in said base, springs interposed between the side sections and base for supporting the side sections, a support for the platen, and means limiting outward movement of said pins.

13. In a machine of the character described, a platen comprising a base, an angularly disposed portion on said base and having an impression surface, side sections, pins on said side sections guided for movement in said base, spring interposed between said side sections and base for normally holding the side sections with their top faces substantially in the plane of said impression surface, means limiting outward movement of said pins, a frame member, studs adjustable in said frame member for supporting the platen, and means for locking the platen in adjusted position.

14. In a machine of the character described, a work support and means for feeding the work, a platen comprising a bed or impression surface arranged at an angle less than a right angle to the direction of feed, movable side sections with their top faces normally substantially in the plane of said impression surface, and menas for yieldingly supporting said side sections; a type wheel having regularly spaced type bars adapted to be brought selectively into position for coaction with said impression surface, the said side sections being depressed by type bars adjacent the printing one and acting as means for stripping the work from the platen on their return movement, the type wheel being the movable member in the printing operation, and work protecting means interposed between the type wheel and the platen.

15. In a machine of the character described, a work support and means for feeding the work, a platen comprising a bed or impression surface arranged at an angle less than a right angle to the direction of feed, movable side sections with their top faces normally substantially in the plane of said impression surface, and means for yieldingly supporting said side sections; a type wheel having ragularly spaced type bars adapted to be brought selectively into position for coacting with said impression surface, the said side sections being depressed by type bars adjacent the printing one and acting as means for stripping the work from the platen on their return movement, the type wheel being the movable member in the printing operation, and work protecting means interposed between the type wheel and the platen, the type bars being so arranged on said wheel that when brought into printing position they present a level surface to the platen.

16. In a machine of the character described, a base, a platen supported on said base, a work support on the base, a casing member supported above said work support, a revolubly supported type wheel mounted in said casing for movement toward and from the platen, said wheel being formed with regularly spaced type bars, and flexible cover plates secured for relative adjustment on the bottom of said casing member with their free edges spaced apart to receive the printing type bar and adapted to be forced downwardly by type bars adjacent the printing one and to strip the work from the type face on return movement of the type wheel.

17. In a machine of the character described, a base, a platen supported on said base and comprising an angularly disposed bed or impression surface and resiliently movable side sections, a casing member supported above said work support, a revolubly supported type wheel mounted in said casing member for movement toward and from the platen, said wheel being formed with type bars arranged for coaction with said impression surface, and flexible cover plates secured to the bottom of said casing member with their free edges spaced apart to receive the printing type bar and to be pressed downwardly by type bars adjacent the printing one to force said side sections below the plane of said impression surface.

18. In a machine of the character described, a base, a platen supported on said base, a work support on the base, a casing member supported above said work support, a revolubly supported type wheel mounted in said casing for movement toward and from the platen, said wheel being formed with regularly spaced angularly disposed type bars, flexible cover plates secured to the bottom of said casing with their free edges parallel to the printing type line and spaced apart, and a rib formed on the under face of one of said plates for the purpose set forth.

19. In a check writing machine, a platen, and a type wheel formed with a plurality of regularly spaced type bars bearing type faces of substantially equal lengths and arranged on the periphery of the wheel at an angle less than a right angle to the axis of rotation so as to print in parallel lines at an angle to the direction of feed of the work, which is axially of said wheel, certain of said type bars bearing numbers in both words and numerals in order that the amount of a check may be printed in both words and numerals with a word and its corresponding numeral on the same line, such words and numerals being similarly arranged on their respective type faces with the space between each word and its numeral filled in with a conventional type form.

20. In a check writing machine, a work support, a check gauge on said support, means for feeding the check, and means for automatically moving the gauge out of contact with the work during each feeding movement of the check.

21. In a check writing machine, a work support, a check gauge on said support, means for feeding the check, and means for automatically effecting a reciprocation of the gauge from and toward the work during each feeding movement of the check.

22. In a check writing machine, a work support, a check gauge on said support, means for feeding the check, and means controlled by said feeding means for effecting a reciprocation of the gauge from and toward the work during each feeding movement of the check.

23. In a check writing machine, a work support, a check gauge on said support, means for adjusting the position of the gauge relative to the work, means for feeding the check, and means controlled by said feeding means for effecting a reciprocation of the gauge from and toward the work during each feeding movement of the check.

24. In a check writing machine, a work support, a feed shaft, a check gauge on said support, a member carried by said gauge, a roller on a stud projecting from said member, and a cam fixed to said feed shaft and engaging said roller, the contour of said cam being such as to effect a slight reciprocation of said gauge from and toward the work on each rotary movement of the feed shaft.

25. In a check writing machine, a bed plate, a feed shaft, a check gauge, means for adjusting the position of the gauge on said bed plate relative to the work, an arm carried by said gauge, a sleeve frictionally held to said arm, a yoke formed on said sleeve and slidable on said feed shaft, a stud projecting from said yoke intermediate its side arms and a roller on said stud, and a cam fixed to said feed shaft and engaging said roller, the contour of said cam being such as to effect a slight reciprocation of the gauge from and toward the work on each rotary movement of the feed shaft.

26. In a check writing machine, a bed plate for supporting the work, a platen substantially in the plane of said bed plate, a feed shaft, two feed rollers fixed to said feed shaft and spaced on opposite sides of said platen but in advance thereof, pressure rollers each independently rotatable and yieldingly held against the feed rollers, a check gauge, and means controlled by the feed shaft whereby each rotary movement thereof effects a slight reciprocation of the check gauge from and toward the work, the said feed rollers and pressure rollers holding the check in proper alignment during the feeding movement.

27. A check writing machine having an opening, means for feeding a check through said opening, and a lock having means operable to obstruct the passage of a check through said opening by the said feeding means.

28. In a check writing machine, two frame members spaced apart for the passage of a check between them on being fed through the machine, a lock secured to one of said members, and a lock bolt movable across the said space for the purpose set forth.

29. In a check writing machine, a base, a work support on the base, a casing member having its bottom spaced above said work support, means for feeding a check through the said space, a lock secured to said base, and a lock bolt movable across the said space and into said casing member for the purpose set forth.

30. In a check writing machine, a base, a cover plate on said base, a platen mounted on said base, a casing member having its bottom spaced above said cover plate to permit feeding a check on said cover plate, feeding means mounted in said base, a type carrier mounted in said casing member for coaction with said platen, a lock secured to said base below said cover plate, and a lock bolt movable across said space and into said casing member for preventing feeding a check through the machine.

31. The combination, in a machine of the character described, of a base, an angularly disposed platen and a feed shaft mounted in said base, feed rollers fixed to said shaft, a cover plate on said base, a casing supported upon said base and having a depending head member with its bottom spaced above said cover plate, a support guided for vertical movement in said head member, a type wheel revolubly mounted in said support and formed with type faces arranged for coaction with said platen and adapted to be brought selectively into printing position, an operating shaft, means for effecting reciprocation of said type wheel support on rotation of such shaft, connections between said support and said feed shaft whereby the feed rollers are turned to feed the work an invariable distance on movement of the type wheel from the platen, a check gauge, and means controlled by said feed shaft for effecting a reciprocation of the gauge from and toward the work during each feeding movement of the work.

32. The combination, in a machine of the character described, of two printing members movable relatively toward and from each other to impress a check held between them, means for feeding the check after each printing operation, a check gauge having a reciprocating movement from and toward the work during each feeding of the check, an operating shaft, and connections effecting the said movements, all of the operable parts being controlled by the rotation of the said operating shaft.

HERMAN C. WELTER.